July 15, 1947.  E. H. SIELING  2,424,125
HANDLE
Filed July 7, 1945
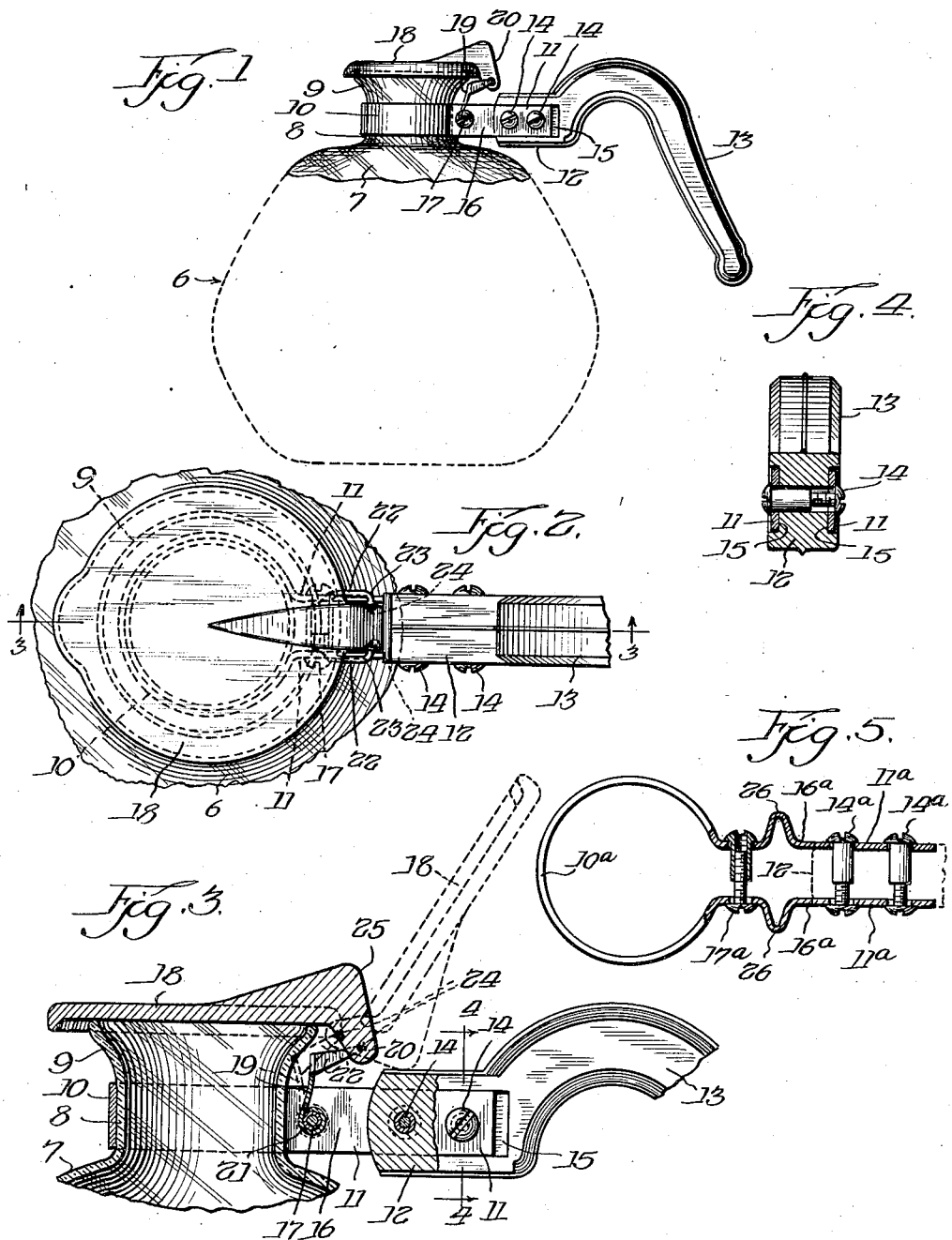
Inventor:
Edward H. Sieling
By Hill & Hill
Attys.

Patented July 15, 1947

2,424,125

UNITED STATES PATENT OFFICE 2,424,125

HANDLE

Edward H. Sieling, Chicago, Ill.

Application July 7, 1945, Serial No. 603,711

9 Claims. (Cl. 215—63)

1

This invention relates to a handle for vessels such as decanters that are commonly supplied as one of the components of coffee makers.

A decanter of the kind with which the handle is used is usually of a bowl-like form having a neck provided with a pouring mouth, and one of the objects of this invention is the provision of a handle having an open loop adapted to partially surround the neck and terminating in legs arranged to be secured to the handle grip of the handle, which handle grip is spaced from the loop whereby portions of the legs of the loop are free to flex when drawn together in clamping the loop upon the neck of the decanter.

Decanters of the kind herein described are usually composed of glass and the necks thereof may vary slightly in diameter, and one of the objects of this invention is to provide a resilient connection between the handle grip and a glass neck of the vessel whereby the loop may be securely fastened thereon without danger of the glass neck cracking under the changes of temperature to which it is subjected when in use.

Another object is the provision of a handle grip having an extension to which the flexible legs of the loop may be rigidly secured, said legs having portions which may flex when drawn together to fasten the loop upon the neck of the vessel.

Another object is to provide a lid for the decanter, together with a novel hinge connection between it and the handle, whereby the lid may be swung back far enough to enable the upper portion of the coffee making unit to be supported by the vessel during the brewing of the coffee.

With these and other objects and advantages in view, this invention consists in the several novel features of construction, arrangement and combination of parts hereinafter fully described and more particularly defined in the appended claims.

The invention is clearly illustrated in the drawing accompanying this specification, in which:

Fig. 1 is a side elevation of a decanter, partly broken away, and equipped with a handle embodying a simple form of the present invention;

Fig. 2 is a plan of the parts in Fig. 1 with the decanter partly broken away;

Fig. 3 is a vertical, longitudinal section taken on the line 3—3 of Fig. 2;

Fig. 4 is a detail vertical cross section taken on the line 4—4 of Fig. 3, and

Fig. 5 is a view partly in plan, and partly in horizontal section, of a slightly modified form of the invention.

Referring to said drawing and first to Figures 1

2 to 4 inclusive, which illustrate one embodiment of the invention, the reference character 6 designates a decanter in the form of a glass vessel having a bowl portion 7 terminating at its upper end in a neck 8, flared at its end 9 to provide a mouth through which the contents of the decanter may be dispensed.

Extending partially around the neck is an open loop 10 from which extend two legs 11, the end portions of which are secured to an extension 12 of the handle grip 13 by screws 14. The loop 10 together with its legs 11 is formed of flexible material.

The handle grip is desirably composed of plastic or other material of low heat conductivity and the extension 12 is formed with a groove 15 on each side for the reception of the end portion of a leg 11, whereby the outer faces of the end portions of the legs may be flush with the side faces of the extension 12.

The end extremity of the extension 12 is spaced away from the loop, whereby to provide two portions 16 that may flex when drawn toward each other in securing the loop upon the neck of the decanter. Connecting the two flexible portions 16 of the legs at a point intermediate the loop and the extreme end of the extension 12 is a screw 17. It is to be observed that the screw 17 may be screwed up quite tightly in order to clamp the loop upon the neck of the decanter, but by reason of the flexibility of the portions 16 of the legs, a rigid connection between the loop and the neck of the decanter is eliminated.

A lid 18 is provided in connection with the handle and said lid is hingedly connected thereto by a hinge connection 19. The lid is of a flat disc-like form having a downturned rim and is provided at the end adjacent the handle grip with a downturned lug 20. The body portion of the hinge connection 19 extends between the portions 16 of the legs 11 and its lower end is looped around the screw 17 as at 21 to provide a pivotal connection with the handle. The body portion of the hinge connection 19 extends above the portions 16 of the legs and from the upper end thereof two wings 22 project toward the handle grip and their extremities are bent toward each other as at 23 to form trunnions that enter sockets 24 formed in the sides of the lug 20, and provide a pivotal connection between the hinge connection 19 and the lid 18.

In Fig. 3 the lid is shown in solid lines in its closed position, and in dotted lines in its fully open position. Whenever the lid is swung into open position, the hinge connection 19 swings toward the left slightly as viewed in Fig. 3 thereby permitting the lid to tilt considerably thus enabling the stem of the upper portion of the coffee making unit to be inserted into the neck of the decanter. Preferably the lug 20 is extended upward above the disc-like portion of the lid to provide a rib 25, which when the lid is opened to fully open position, rests upon the extension 12 of the handle grip and supports the lid in its fully open inclined position.

In the modified form of the invention illustrated in Fig. 5, the loop 10a is formed with the legs 11a as in the preferred form, which legs are secured to the handle grip by the screws 14a. Intermediate the loop and the extremity of the extension of the handle grip is a screw 17a for connecting the two flexible portions 16a of the legs. In order to obtain greater flexibility, each portion 16a of the legs is formed with an outwardly extending U bend 26.

From the above description it is apparent that I have eliminated the usual rubber or pliable cushion between the loop and neck of the decanter which is used on most of the coffee makers now on the market.

While the screws above referred to may be of the ordinary conventional type, for the sake of appearance they are preferably of the male and female socket type as shown.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A handle for decanters having a neck and comprising a flexible open loop adapted to partially surround the neck of the decanter and terminating in two flexible legs having end portions, a handle grip having an extension disposed between the end portions of the legs, screws for securing the legs to the handle grip extension, and a screw connecting said legs at a point intermediate the loop and the extremity of the handle grip extension for tightening the loop upon said neck, the portions of the legs between the loop and the handle grip extension being capable of flexing when the screw is screwed up tightly.

2. A handle for decanters having a neck and comprising a flexible strip of material having an open loop at one end adapted to partially surround the neck of the decanter and terminating in two spaced substantially parallel flexible legs having end portions, a handle grip having an extension disposed between the end portions of said legs, screws for securing the legs to the handle grip extension, and a screw connecting said legs at a point intermediate the loop and the extreme end of the handle grip extension for tightening the loop upon said neck, the portions of the legs between the neck and the handle grip extension being capable of flexing when the screw is screwed up tightly.

3. A handle for decanters having a neck and comprising an open loop adapted to partially surround the neck of the decanter and terminating in two substantially parallel legs having end portions, a handle grip having an extension disposed between the end portions of the legs, said extension being formed with grooves on its side faces adapted to receive the end portions of the legs, screws extending through said end portions of the legs and the handle grip extension for rigidly securing the legs thereto, the handle grip extension being spaced from the loop to provide two flexible portions in the legs, and a screw connecting said flexible portions of the legs for tightening the loop upon the neck of the decanter, said flexible portions of the legs being capable of flexing when the last mentioned screw is screwed up tight.

4. A handle for glass decanters having a neck and comprising a strip of resilient material having an open loop at one end adapted to partially surround the neck of the decanter and terminating in two substantially parallel legs, a handle grip having an extension at one end formed with a groove in each side adapted to receive an end portion of a leg, screws fastening said handle grip to the legs with the extension spaced from the loop, and connecting means located intermediate the loop and the grip extension for drawing portions of the legs together, whereby to secure the loop on the neck of the decanter, said portions of the legs flexing when drawn toward each other with the loop secured on the neck of the decanter.

5. A handle for decanters having a neck and comprising an open loop adapted to partially surround the neck of the decanter and terminating in two substantially parallel legs having end portions, a handle grip having an extension disposed between the end portions of the legs, screws extending through said end portions of the legs and the handle grip extension for rigidly securing the legs thereto, the handle grip extension being spaced from the loop to provide two flexible portions in the legs and said legs being formed with U bends in said flexible portions of the legs, and a screw connecting said flexible portions of the legs for tightening the loop upon the neck of the decanter, said flexible portions of the legs together with the U bends being capable of flexing when the last mentioned screw is screwed up tight.

6. In combination with a decanter handle having an open loop adapted to partially surround a neck of a decanter and terminating in two spaced substantially parallel legs, a handle grip secured to said legs with its extreme end spaced from the loop, a screw located intermediate the loop and the handle grip and connecting said legs whereby to fasten the loop upon a neck of the decanter, a lid for said decanter having a hinge connection pivotally connected at one of its ends to one end of the lid and pivotally connected at its other end to said screw.

7. In combination with a decanter handle having an open loop adapted to partially surround a neck of a decanter and terminating in two spaced substantially parallel legs, a handle grip having an extension secured to said legs with its end spaced from the loop, a screw located intermediate the loop and the handle grip extension and connecting said legs whereby to fasten a loop upon the neck of a decanter, a lid for said decanter having a downwardly projecting lug at the handle end and a hinge connection pivotally connected at one of its ends to the lug and pivotally connected at its other end to said screw.

8. In combination with a decanter handle having an open loop adapted to partially surround a neck of the decanter and terminating in two spaced substantially parallel legs, a handle grip having an extension secured to said legs with its end spaced from the loop, a screw located between the loop and the handle grip extension and connecting said legs whereby to fasten a loop on the neck of the decanter, a lid for said decanter having a down-turned lug at one side and a hinge connection having a body portion from which extend wings pivotally connected to the lug of the lid, the body portion of the hinge connection being pivotally connected to said screw.

9. A handle for decanters comprising a flexible loop adapted to be secured upon a neck of the decanter and terminating in two flexible legs having end portions, a handle grip having an extension disposed between the end portions of the legs and secured thereto by screws, and a screw connecting said legs at a point intermediate the loop and the handle grip extension for tightening the loop upon said neck, the portions of the legs between the loop and the handle grip extension being capable of flexing when the screw is screwed up tightly.

EDWARD H. SIELING.

REFERENCES CITED

The following references are of record in the file of this patent:

UNITED STATES PATENTS

| Number | Name | Date |
|---|---|---|
| 1,603,101 | Alexander | Oct. 12, 1926 |
| 2,137,884 | Weeks | Nov. 22, 1938 |
| 2,359,189 | Alsdorf | Sept. 26, 1944 |
| 2,227,540 | Fry | Jan. 7, 1941 |
| 2,359,405 | Cory | Oct. 3, 1944 |
| 2,378,867 | Reichart | June 19, 1945 |
| 2,378,866 | Reichart | June 19, 1945 |
| 2,307,145 | Matoon | Jan. 5, 1943 |

FOREIGN PATENTS

| Number | Country | Date |
|---|---|---|
| 835,095 | France | Sept. 12, 1938 |